United States Patent [19]
Ohtake

[11] Patent Number: 5,683,047
[45] Date of Patent: Nov. 4, 1997

[54] SPINNING REEL HAVING ADVANTAGEOUSLY POSITIONED COMPONENTS FOR RECIPROCATING THE SPOOL

[75] Inventor: Yushi Ohtake, Saitama, Japan

[73] Assignee: Daiwa Seiko, Inc., Tokyo, Japan

[21] Appl. No.: 655,942

[22] Filed: May 31, 1996

[30] Foreign Application Priority Data

Jul. 4, 1995 [JP] Japan ................................. 7-191220

[51] Int. Cl.$^6$ ............................................. A01K 89/01
[52] U.S. Cl. ........................ 242/241; 242/242; 242/311
[58] Field of Search ............................ 242/241, 242, 242/311

[56] References Cited

U.S. PATENT DOCUMENTS

| | | | |
|---|---|---|---|
| 2,854,200 | 9/1958 | Montgomery | 242/241 |
| 4,770,363 | 9/1988 | Tsunoda et al. | 242/241 |
| 4,892,267 | 1/1990 | Webb | 242/241 |
| 5,012,990 | 5/1991 | Kawabe | 242/242 |

FOREIGN PATENT DOCUMENTS

| | | |
|---|---|---|
| 61-204478 | 12/1986 | Japan . |
| 63-119361 | 6/1988 | Japan . |
| 7-6773 | 2/1995 | Japan . |

*Primary Examiner*—Katherine Matecki
*Attorney, Agent, or Firm*—Sughrue, Mion, Zinn, Macpeak & Seas, PLLC

[57] ABSTRACT

A fishing spinning reel which is compact, yet operates stably even when exposed to unfavorable conditions. A part of a rotor (16) provided around a rotary shaft (16J) of the rotor is formed into a cylindrical protrusion (16C). The cylindrical protrusion (16C) is so arranged that, at least when a spool (18) is retracted to the rearmost position, the cylindrical protrusion (16C) of the rotor enters the spool from behind. The front end portion of a reel housing (10) is similarly formed into a cylindrical protrusion (10M). The cylindrical protrusion (10M) of the reel housing (10) is set within the cylindrical protrusion (16C) of the rotor. At least essential parts (e.g., a transverse cam shaft 24 and a slider 26) of a mechanism for moving the spool (12) back and forth are provided in an available space between a handle shaft (14) to which a handle (12) is connected and a front wall of the cylindrical protrusion (10M).

23 Claims, 3 Drawing Sheets

* # SPINNING REEL HAVING ADVANTAGEOUSLY POSITIONED COMPONENTS FOR RECIPROCATING THE SPOOL

The following disclosure is based on Japanese Patent Application No. 7-191220 filed on Jul. 4, 1995, which is incorporated into this application by reference.

BACKGROUND OF THE INVENTION

1. Field of the Invention

This invention relates to providing a fishing spinning reel which is compact. It further relates to a fishing spinning reel that is simple and elegant in construction.

2. Description of the Related Art

Fishing spinning reels have reciprocating mechanisms for moving the spool back and forth. A fishing spinning reel in which the reciprocating mechanism is provided in the reel housing has been disclosed, for instance, by Japanese Utility Patent Application Publication No. 6773/1995. In addition, a fishing spinning reel in which the reciprocating mechanism is provided between the rotor and the spool has been disclosed, for instance, by Japanese Utility.. Patent Application (OPI) No.'s 204478/1986 and 119361/1988 (the term "OPI" as used herein means an "unexamined publication application").

SUMMARY OF THE INVENTION

In the fishing spinning reel disclosed by Japanese Utility Patent Application Publication No. 6773/1995, the reciprocating mechanism is provided in the reel housing in such a manner that it extends backwardly from below the handle shaft. Hence, unavoidably, the rear part of the reel housing is elongated to some extent. This fact imposes limitations on the provision of a compact reel.

In the fishing spinning reel disclosed by Japanese Utility Patent Application (OPI) No. 204478/1986, a casing different from the reel housing is secured to the reel shaft, and the reciprocating mechanism is set in the secured casing. The rotor is arranged between the reel housing and the casing; that is, the reel housing is divided by the rotor into two parts. Hence, the spinning reel suffers from the following disadvantages. First, the number of components is relatively large, and the construction is intricate as a whole. Further, for instance when the fishing line is taken up, the reel is liable to be unstable. In addition, sea water, sand, dust, and forth are liable to enter the reel through gaps, which makes it impossible to maintain the reciprocating mechanism stably operable at all times.

With the teachings disclosed by Japanese Utility Patent Application (OPI) No. 119361/1988, the length, in the front-to-rear direction, of the reel housing of a fishing spinning reel can be reduced. The reciprocating mechanism is arranged between the rotor and the spool which moves back and forth. But, in such an arrangement, there is necessarily a gap between those two components. Through the gap, sea water, sand, dust, and so forth are liable to enter the reel, which makes it impossible to keep the reciprocating mechanism operating stably at all times.

In view of the foregoing, an object of the invention is to provide a fishing spinning reel which is compact, yet stable in operation even if used in fishing locations having conditions unfavorable to the reel. It is a further object to provide a spinning reel having a simple, reliable and elegant internal configuration.

The foregoing objects of the invention are achieved by the provision of a spinning reel, in which, according to the invention, a part of a rotor provided around the rotary shaft of the rotor, is formed into a cylindrical protrusion, the cylindrical protrusion of the rotor is so arranged that, at least when a spool is retracted to its rearmost position, the cylindrical protrusion of the rotor enters the spool from behind, the front end portion of a reel housing is formed into a cylindrical protrusion, the cylindrical protrusion of the reel housing is set in the cylindrical protrusion of the rotor, and at least essential parts of a mechanism for moving the spool back and forth are provided in a space between a handle shaft, to which a handle is connected, and the front wall of the cylindrical protrusion of the reel housing.

A part of the rotor which is provided around the axis of rotation of the rotor is formed into a protruding cylinder which is allowed to enter the spool from behind. The front portion of the reel housing is similarly formed into a protruding cylinder which enters into the protruding cylinder of the rotor. Hence, at least essential components of the reciprocating mechanism can be arranged in a front portion of the reel housing. This renders it unnecessary for the rear end portion of the reel housing to protrude so much. Also, the front cylindrical protrusion of the reel housing is set in the spool and the rotor. This will not increase the overall length of the reel. Accordingly, the reel can be made more compact.

The reciprocating mechanism is provided in the reel housing, and therefore sea water, sand, dust, etc. scarcely enter the reel. Hence, the reciprocating mechanism operates stably. In addition, the reel is simple in construction, and reeling operations such as fishing-line winding operations are rendered highly stable.

BRIEF DESCRIPTION OF THE DRAWINGS

Preferred embodiments of the invention will be described with reference to the accompanying drawings, in which.

DETAILED DESCRIPTION OF THE PREFERRED EMBODIMENTS OF THE INVENTION

Preferred embodiments of the invention will be described with reference to the accompanying drawings in detail.

First Embodiment

Figure 1:
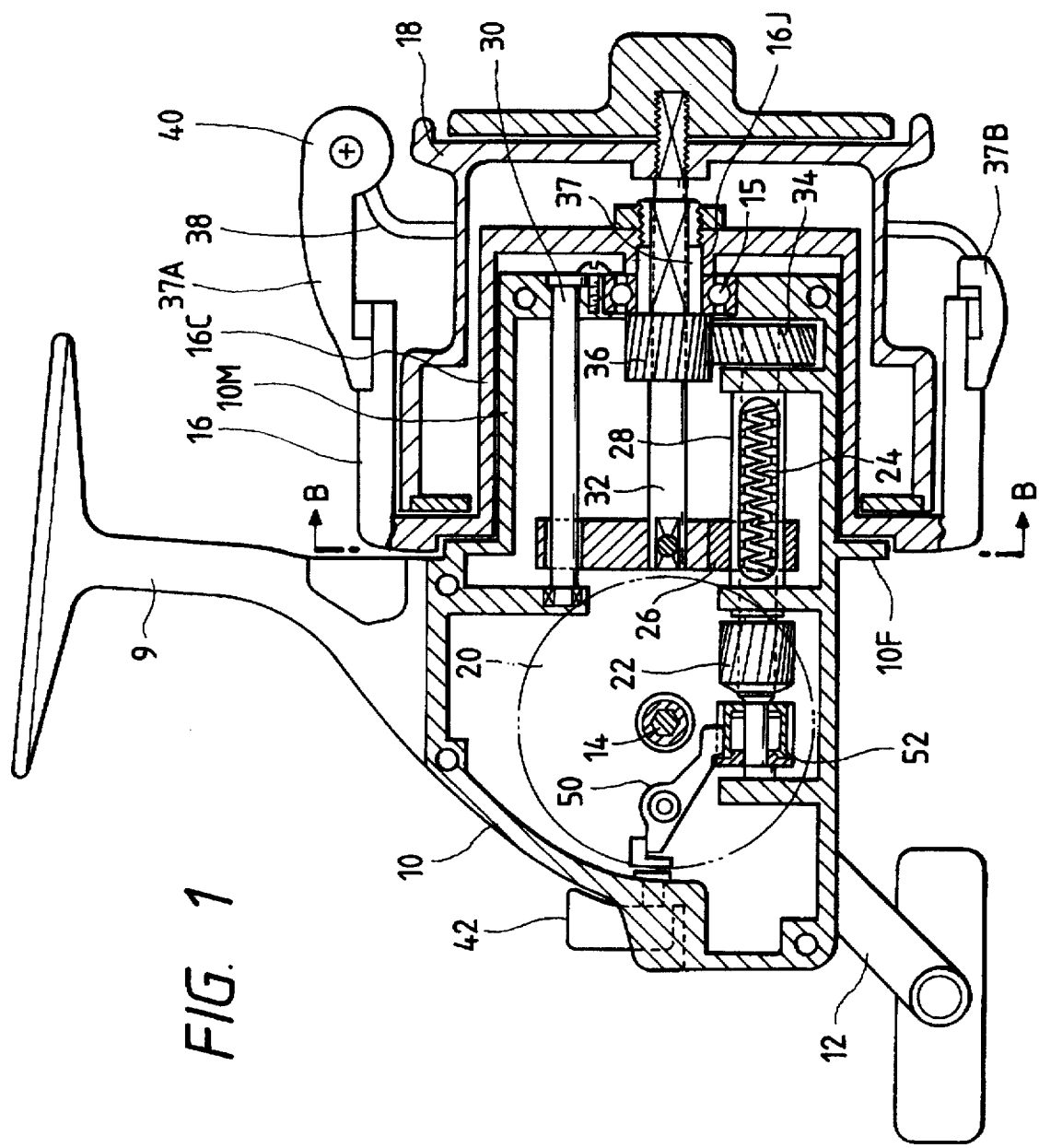
FIG. 1 is a vertical sectional view showing essential components of an example of a fishing spinning reel constituting a first embodiment of the invention.
Figure 2:
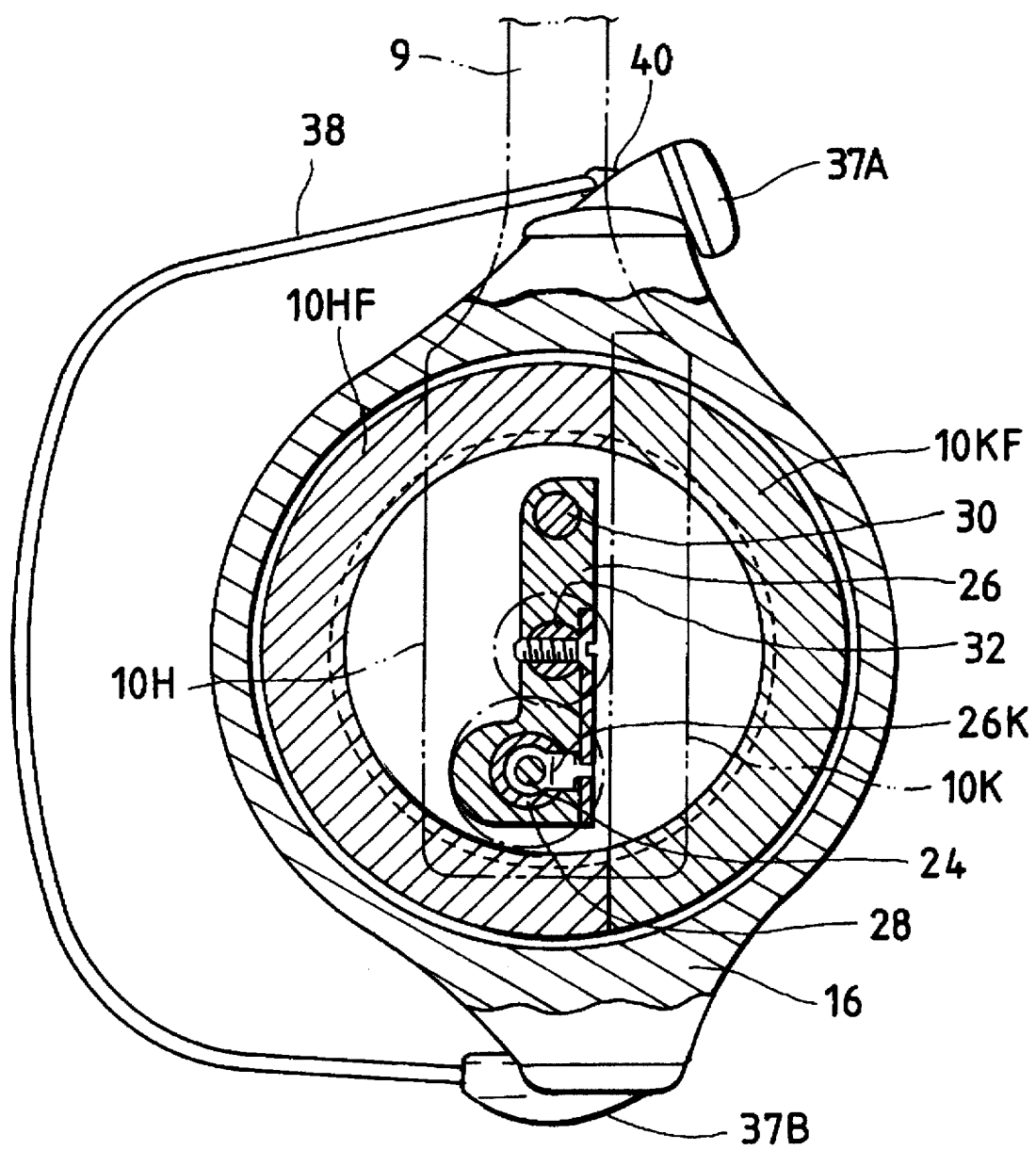
FIG. 2 is a sectional view taken along line B—B in FIG. 1.

FIG. 1 is a vertical sectional view of an example of a fishing spinning reel, which constitutes a first embodiment of the invention. FIG. 2 is a sectional view taken along line B—B in FIG. 1. The spinning reel has a leg 9, and a reel housing 10 below the leg 9. The front end portion of the reel housing 10 is formed into a cylindrical protrusion 10M which protrudes forwardly as shown in FIG. 1. The spinning reel further includes a rotor 16 which has a cylindrical protrusion 16C around its rotary shaft section 16J formed in such a manner that the cylindrical protrusion 16C also protrudes forwardly. The cylindrical protrusion 10M of the aforementioned reel housing 10 is coaxially arranged inside the cylindrical protrusion 16C of the rotor 16. The cylindrical protrusion 16C is so arranged that it is inside the rear part of the spool 18 not only when the spool 18 is shifted to a maximally backward position, as shown in FIG. 1, but also when it is shifted maximally forward. This means that the length, in the front-to-rear direction, of the reel can be shortened accordingly.

A handle 12 is connected to a handle shaft 14 provided in the rear portion of the reel housing 10. The handle shaft 14 is positioned in such a manner that the handle shaft 14 extends in a right-to-left direction(perpendicular to the surface of the drawing FIG. 1) and is rotatably supported by the reel housing 10. Accordingly, there is a relatively large space in front of the handle shaft 14, and a reciprocating mechanism for moving the spool 18 back and forth is provided below the handle shaft 14 and in the internal space of the aforementioned cylindrical protrusion 10M, which lies in front of the handle shaft. That is, a pinion gear 22 is so arranged as to engage with a drive gear 20 mounted on the handle shaft 14. Further, the front portion of a rotary shaft, extending in the front-to-rear direction and rotated 20 together with the pinion gear 22, is employed as a traverse cam shaft 24 that forms an essential component of the reciprocating mechanism for this embodiment. A slider 26, which is another essential component of the reciprocating mechanism for this embodiment, has an engaging element 26K (see FIG. 2) which engages with the traverse cam shaft 24. This arrangement results in the slides 26 being moved back and forth in synchronization with the rotation of the traverse cam shaft 24.

In order to move the slider 26 back and forth smoothly, a guide cylinder 28 is loosely fitted on the traverse cam shaft 24, and a guide lever 30 is coupled to the reel housing 10 so as to be parallel with the guide cylinder 28. The guide lever 30 is located above the guide cylinder 28, so that the forward and backward movement of the slider 26 is guided by the guide cylinder 28 and the guide lever 30. A spool shaft 32 is secured to the middle of the slider 26. More specifically, the spool shaft 32 has the above-described spool 18 fastened thereto at one end, and extends in the front-to-rear direction, i.e., in parallel with the guide cylinder 28.

The rotary shaft section 16J of the rotor 16 is supported by a bearing 15 held by the cylindrical protrusion 10M, and engages a cylindrical shaft 37. The shaft 37 is loosely mounted on the spool shaft 32 in such a manner that it does not rotate with respect to the cylindrical shaft 37. A gear 36 is mounted on the rear part of the cylindrical shaft 37. The gear 36 engages a gear 34, which is mounted on the one end of the aforementioned traverse cam shaft 24 and, accordingly, turns together with the cam shaft 24. Hence, by turning the handle 12, the spool 18 is moved back and forth together with the spool shaft 32 while the rotor 16 turns.

As best shown in FIG. 2, the reel housing 10 has a reel body 10H integral with the leg 9 and a cover 10K covering a side opening of the reel body 10H. The cover is detachably mounted with screws in such a manner that it is held water-tight. The front end portion of the reel housing thus formed is the cylindrical protrusion 10M as was described before. The gap (or clearance) between the cylindrical protrusion 10M and the rotor 16 which turns around the protrusion 10M is reduced as much as possible, in order to prevent sand or the like from entering. Reducing the gap also helps to reduce the reel diameter (for compactness). In addition, in order to bend the passageway defined by the gap, to more effectively prevent the entrance of sand or the like, the reel housing 10 has a flange 10F that extends perpendicularly to the cylindrical wall of the cylindrical protrusion 10M. More specifically, the flange 10F confronts the rear end surface of the rotor 16 with only a small gap between them. Even if sea water or the like enters the gap between the reel body 10 and the rotor 16, the bearing 15 is covered with fat and oil, to repel water, so that the internal mechanisms in the reel housing 10 are protected from water, salt, sand, etc. Thus, the reciprocating mechanism can be stably operated at all times.

The flange 10F includes a body-side flange 10HF for the reel body 10H and a cover-side flange 10KF for the cover 10K as shown in FIG. 2. A bail 38, and right and left bail supporting members 37A and 37B supporting the bail are coupled to the rotor 16 in such a manner that they turn together with the rotor. The portion 40 of one of the bail supporting members 37A is a fishing line guide section adapted to guide a fishing line, for winding the line onto the spool.

If the fishing spinning reel is constructed as described above, the interior space of the rear housing 10 in the vicinity of the handle shaft 14 is small in volume, yet large enough to accommodate the drive gear 20. In other words, in this spinning reel, unlike in the conventional one, it is unnecessary to have the portion of the rear housing 10 that lies behind the handle shaft 14 extend as far backward as do the analogous portions in the related art reels described earlier in this application. Additionally, the reciprocating mechanism is accommodated in a single reel housing, and is therefore simple in arrangement and stable in operation. A corresponding space for accommodating the drive gear 20 is provided between the pinion gear 22 and the reel housing 10. Finally, an additional space can be obtained in the lengthwise direction (front-to-rear direction) without affecting the length of the reel housing. In that space, a rotor reverse-rotation preventing mechanism is arranged.

The rotor reverse-rotation preventing mechanism includes a rolling type one-way clutch 52 and a stopper 50. The one-way clutch 52 is mounted on the same shaft on which the pinion gear 22 is mounted. More specifically, it is mounted on the rear end portion of the traverse cam shaft 24. When the one-way clutch 52 is engaged, the stopper 50 locks into the outer race of the one-way clutch 52, so that the rotor can be turned only in the forward direction, but not in the reverse direction. A change-over lever 42, located above the rear end portion of the reel housing is provided for disengaging the stopper 50 from the one-way clutch 51. When set to disengage the stopper 50, the change-over lever 42 allows the rotor to be turned in the reverse direction as well as the forward direction.

Second Embodiment

Figure 3:
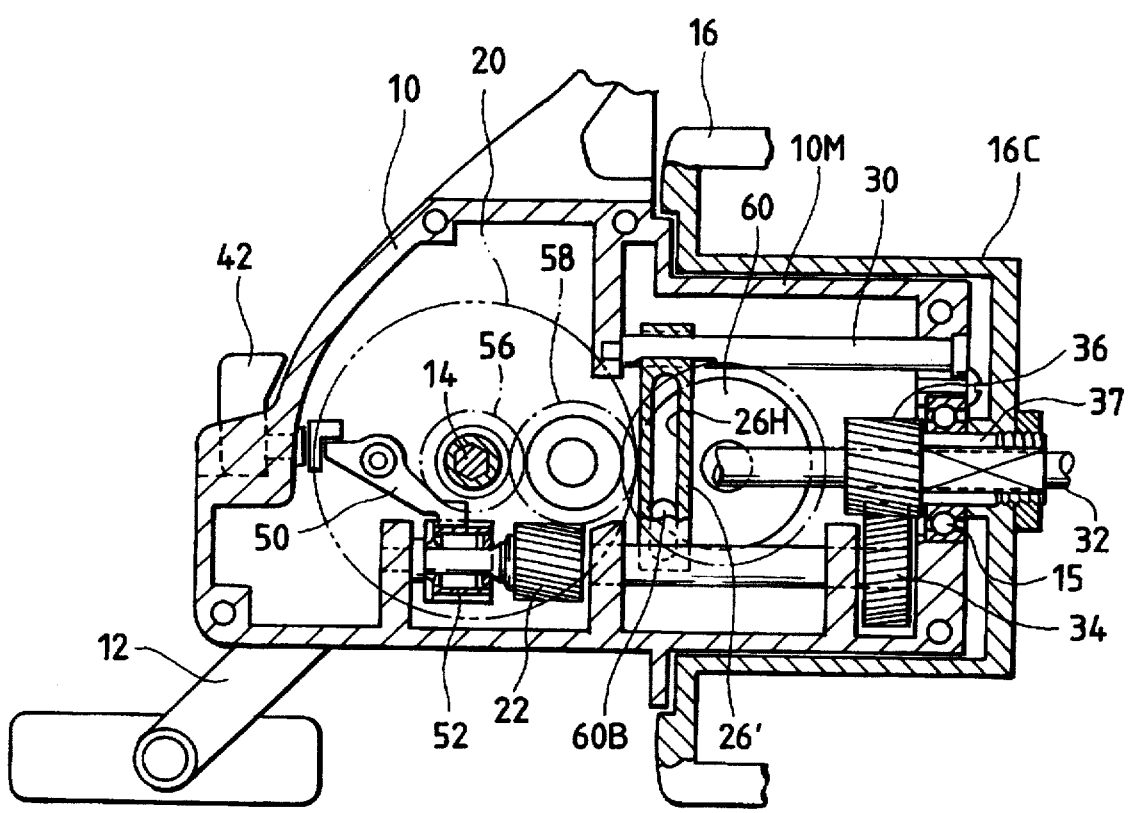
FIG. 3 is a vertical sectional view showing essential components of another example of the fishing spinning reel constituting a second embodiment of the invention.

FIG. 3 shows a second embodiment which is different from the above-described first embodiment only in the details of its reciprocating mechanism. As the handle 12 is turned, a gear 56, integral with the drive gear 20 and fixedly mounted on the handle shaft 14, also turns. As a result, a gear 60 turns through a gear 58 that is engaged with the gear 56. The gear 60 is an essential component of the reciprocating mechanism of this second embodiment. A rotary shaft for the gear 60 extends in the right-to-left direction of the reel. The gear 60 has a protrusion 60B which is off-centered, preferably located near the periphery of the gear 60, and also extends in the right-to-left direction. A slider 26' moves back and forth along the guide lever 30. The slider 26' is also an essential component of the reciprocating mechanism for this embodiment. The slider 26' has an elongated hole 26H which extends vertically. The hole 26H engages the aforementioned protrusion 60B. The other components are essentially the same as those of the first embodiment.

Hence, as the handle 12 is turned, the gear 60 turns and moves the slider 26' back and forth. As a result, the spool shaft 32 moves back and forth, since it is coupled to the slider 26'. The rotation of the drive gear 20 is transmitted through the pinion gear 22, the gear 34, and the gear 36 to the rotor 16, causing the rotor 16 to turn. Because of the space in the cylindrical protrusion 10M, the essential components of the reciprocating mechanism can be arranged in front of the handle shaft 14 in this second embodiment as well. Accordingly, it is unnecessary for the rear end portion of the reel housing to protrude greatly. This feature greatly contributes to the fabrication of a compact spinning reel. Also, the internal mechanisms in the reel housing are enclosed by the reel housing and the bearing 15. These mechanisms are thus shielded from adverse effects from sea water, dust, and so forth which otherwise could enter the housing. Thus, the reciprocating mechanism operates stably at all times. In addition, since the reciprocating mechanism is simple in construction, the reeling operation is highly stable at all times.

As is apparent from the above description, the spinning reel according to the invention is compact, yet stable in operation even when used in locations having unfavorable conditions.

What is claimed is:

1. A spinning reel, comprising a main drive gear,
   a rotor having a portion provided around an axis of rotation of said rotor and formed into a cylindrical protrusion, wherein said rotor rotates in response to a rotation of said main drive gear,
   a spool configured such that said cylindrical protrusion of said rotor enters said spool from behind said spool at least when said spool is moved to a rearmost position,
   a reel housing having a front end portion and a front wall which form a cylindrical protrusion, and
   a mechanism adapted to move said spool back and forth between said rearmost position and a forward-most position,
   wherein said mechanism is provided at least substantially in a space between said front wall of said cylindrical protrusion of said reel housing and a handle shaft to which a handle is connected,
   wherein said cylindrical protrusion of said reel housing is at least partially disposed in said cylindrical protrusion of said rotor, and
   wherein said mechanism is entirely disposed substantially in front of a rearmost portion of said main drive gear when said spool is located in said rearmost position.

2. The spinning reel according to claim 1, wherein said mechanism comprises:
   a cam shaft, arranged to rotate in accordance with actuation of the handle, and
   a slider, which is arranged to move said spool back and forth between said rearmost position and said forward-most position in accordance with a rotation of said cam shaft,
   wherein at least a portion of said cam shaft and said slider is substantially disposed in said space between said front wall of said cylindrical protrusion of said reel housing and said handle shaft.

3. The spinning reel according to claim 2, wherein a rear distal portion of said cam shaft extends rearward below said handle shaft.

4. The spinning reel according to claim 2, further comprising:
   a spool shaft which is secured to said spool and said slider such that said mechanism moves said spool back and forth by moving said spool shaft back and forth via said slider,
   wherein said spool shaft is entirely disposed in front of said rearmost portion of said main drive gear when said spool is moved to said rearmost position.

5. The spinning reel according to claim 4, wherein said main drive gear rotates around a main gear axis which is coaxial with a longitudinal axis of said handle shaft and wherein said spool shaft is entirely disposed in front of said handle shaft when said spool is moved to said rearmost position.

6. The spinning reel according to claim 5, wherein said spool shaft is entirely disposed in front of a forward-most portion of said main drive gear when said spool is moved to said rearmost position.

7. The spinning reel according to claim 4, wherein said slider is entirely disposed in front of said rearmost portion of said main drive gear when said spool is moved to said rearmost position.

8. The spinning reel according to claim 7, wherein said main drive gear rotates around a main gear axis which is coaxial with a longitudinal axis of said handle shaft and wherein said slider is entirely disposed in front of said handle shaft when said spool is moved to said rearmost position.

9. The spinning reel according to claim 8, wherein said slider is entirely disposed in front of a forward-most portion of said main drive gear when said spool is moved to said rearmost position.

10. The spinning reel according to claim 1, wherein said cylindrical protrusion of said reel housing is coaxial with said cylindrical protrusion of said rotor.

11. The spinning reel according to claim 1, wherein said cylindrical protrusion of said rotor extends at least partially into said spool from behind when said spool is extended to said forward-most position.

12. The spinning reel according to claim 1, wherein both said cylindrical protrusion of said rotor and said cylindrical protrusion of said reel housing are disposed substantially inside said spool from behind said spool when said spool is retracted to the rearmost position.

13. The spinning reel according to claim 1, wherein said handle shaft extends in a right-to-left direction perpendicular to the axis of rotation of said rotor and is rotatably supported by said reel housing.

14. The spinning reel according to claim 1, wherein at least a substantial portion of said mechanism are enclosed in a substantially water-tight housing.

15. The spinning reel according to claim 14, wherein at least a portion of said reel housing forms at least a portion of said substantially water-tight housing.

16. The spinning reel according to claim 1, wherein said mechanism comprises:
   a slider gear which rotates in accordance with actuation of said handle, and
   a slider which is movably coupled to said slider gear and which moves said spool back and forth between said rearmost position and said forward-most position in accordance with a rotation of said slider gear,
   wherein at least a portion of said slider gear and said slider is substantially disposed in said space between said front wall of said cylindrical protrusion of said reel housing and said handle shaft.

17. The spinning reel according to claim 16, wherein said slider gear rotates about a slider gear axis and comprises a slider gear protrusion disposed on a surface of said slider gear at a radial distance from said slider gear axis, and wherein said slider comprises a longitudinal slot for receiving said slider gear protrusion such that said slider moves said spool back and forth between said rearmost position and said forward-most position in accordance with said rotation of said slider gear.

18. The spinning reel according to claim 16, further comprising:

a spool shaft which is secured to said spool and said slider such that said mechanism moves said spool back and forth by moving said spool shaft back and forth via said slider, wherein said spool shaft is entirely disposed in front of said rearmost portion of said main drive gear when said spool is moved to said rearmost position.

19. The spinning reel according to claim 18, wherein said main drive gear rotates around a main gear axis which is coaxial with a longitudinal axis of said handle shaft and wherein said spool shaft is entirely disposed in front of said handle shaft when said spool is moved to said rearmost position.

20. The spinning reel according to claim 19, wherein said spool shaft is entirely disposed in front of a forward-most portion of said main drive gear when said spool is moved to said rearmost position.

21. The spinning reel according to claim 18, wherein said slider is entirely disposed in front of said rearmost portion of said main drive gear when said spool is moved to said rearmost position.

22. The spinning reel according to claim 21, wherein said main drive gear rotates around a main gear axis which is coaxial with a longitudinal axis of said handle shaft and wherein said slider is entirely disposed in front of said handle shaft when said spool is moved to said rearmost position.

23. The spinning reel according to claim 22, wherein said slider is entirely disposed in front of a forward-most portion of said main drive gear when said spool is moved to said rearmost position.

* * * * *